(12) United States Patent
Guay et al.

(10) Patent No.: US 11,821,758 B2
(45) Date of Patent: Nov. 21, 2023

(54) VALIDATION OF A MEASUREMENT MACHINE

(71) Applicant: PRATT & WHITNEY CANADA CORP., Longueuil (CA)

(72) Inventors: Julien Guay, Montreal (CA); Mario Blais, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 39 days.

(21) Appl. No.: 17/213,055

(22) Filed: Mar. 25, 2021

(65) Prior Publication Data

US 2022/0307873 A1    Sep. 29, 2022

(51) Int. Cl.
| | | |
|---|---|---|
| *G01D 18/00* | (2006.01) | |
| *G01M 15/14* | (2006.01) | |
| *G01M 15/04* | (2006.01) | |
| *G01B 21/04* | (2006.01) | |

(52) U.S. Cl.
CPC .......... *G01D 18/00* (2013.01); *G01B 21/042* (2013.01); *G01B 21/045* (2013.01); *G01D 2218/00* (2021.05); *G01D 2218/10* (2021.05); *G01M 15/04* (2013.01); *G01M 15/14* (2013.01)

(58) Field of Classification Search
CPC .............. G01D 18/00; G01D 2218/10; G01D 2218/00; G01M 15/14; G01M 15/04; G01B 21/042; G01B 21/045
See application file for complete search history.

(56) References Cited

U.S. PATENT DOCUMENTS

| | | | |
|---|---|---|---|
| 5,257,460 | A | 11/1993 | McMurtry |
| 5,313,410 | A | 5/1994 | Watts |
| 6,233,533 | B1 | 5/2001 | Xu et al. |
| | | (Continued) | |

FOREIGN PATENT DOCUMENTS

| | | | | |
|---|---|---|---|---|
| DE | 102010011841 B4 | * | 6/2015 | ........... G01B 21/045 |
| EP | 2149775 | | 2/2010 | |

(Continued)

OTHER PUBLICATIONS

Extended European Search Report, EP21174777.9, dated Nov. 9, 2021.

*Primary Examiner* — Daniel R Miller
*Assistant Examiner* — Christian T Bryant
(74) *Attorney, Agent, or Firm* — NORTON ROSE FULBRIGHT CANADA LLP

(57) ABSTRACT

The present disclosure relates to methods and systems for validating a measurement machine. A group of validation measurements associated with a reference part is obtained. The group of validation measurements includes at least a first measurement associated with a first tolerance and a second measurement associated with a second tolerance, the second tolerance being smaller than the first tolerance. A dimension of the reference part associated with the first measurement is measured to obtain a measurement value. The measurement value is compared to a nominal value associated with the first measurement to obtain a measurement error. The measurement error is compared to the second tolerance associated with the second measurement. When the measurement error is less than the second tolerance, a validation signal is issued to the measurement machine.

20 Claims, 4 Drawing Sheets

(56) References Cited

U.S. PATENT DOCUMENTS

| | | |
|---|---|---|
| 7,036,236 B1 | 5/2006 | Drescher et al. |
| 7,712,224 B2 | 5/2010 | Hicks |
| 8,219,353 B2 | 7/2012 | Lee et al. |
| 9,151,602 B2 | 10/2015 | Noda et al. |
| 9,335,143 B2 | 5/2016 | Noda et al. |
| 10,591,288 B2 * | 3/2020 | Farniok ................. G01B 11/16 |
| 10,648,791 B2 | 5/2020 | Lamendola |
| 10,852,709 B2 | 12/2020 | Blais et al. |
| 2005/0143956 A1 | 6/2005 | Long et al. |
| 2006/0191149 A1 | 8/2006 | Banks et al. |
| 2018/0372486 A1 * | 12/2018 | Farniok .................... B64F 5/60 |
| 2020/0240767 A1 * | 7/2020 | Allen ................... G01B 21/047 |
| 2021/0140753 A1 * | 5/2021 | Eckardt ................ G01B 11/005 |
| 2022/0067602 A1 * | 3/2022 | Diet ....................... G06Q 50/04 |

FOREIGN PATENT DOCUMENTS

| | | | |
|---|---|---|---|
| EP | 2840354 | 2/2015 | |
| FR | 3013115 A1 * | 5/2015 | ........... G01B 21/042 |
| JP | 2008070181 | 3/2008 | |

* cited by examiner

VALIDATION OF A MEASUREMENT MACHINE

TECHNICAL FIELD

The application relates to validation of machines for the measurement of components.

BACKGROUND OF THE ART

The manufacturing of components is a complex process that involves many steps. Certain manufacturing processes include inspection steps, in which a component in the process of manufacture is inspected to ensure conformity to certain standards. Changes in manufacturing processes, as well as wear and tear and other factors, may produce negative impacts.

While existing approaches for validating measurement machines may be suitable for their purposes, improvements remain desirable.

SUMMARY

In accordance with at least one broad aspect, there is provided a method for validating a measurement machine. A group of validation measurements associated with a reference part is obtained, the group of validation measurements comprising at least a first measurement associated with a first tolerance and a second measurement associated with a second tolerance, the second tolerance being smaller than the first tolerance. A dimension of the reference part associated with the first measurement is measured to obtain a measurement value. The measurement value is compared to a nominal value associated with the first measurement to obtain a measurement error. The measurement error is compared to the second tolerance associated with the second measurement. When the measurement error is less than the second tolerance, a validation signal is issued to the measurement machine for a plurality of inspection measurements associated with at least one production part and based on the group of validation measurements.

In accordance with at least one other broad aspect, there is provided a system for validating a measurement machine. The system comprises a processing device and a non-transitory computer-readable medium. The computer-readable medium has stored thereon instructions executable by the processing device for causing the system to perform: obtaining a group of validation measurements associated with a reference part, the group of validation measurements comprising at least a first measurement associated with a first tolerance and a second measurement associated with a second tolerance, the second tolerance being smaller than the first tolerance; measuring a dimension of the reference part associated with the first measurement to obtain a measurement value; comparing the measurement value to a nominal value associated with the first measurement to obtain a measurement error; comparing the measurement error to the second tolerance associated with the second measurement; and when the measurement error is less than the second tolerance, issuing a validation signal to the measurement machine for a plurality of inspection measurements associated with at least one production part and based on the group of validation measurements.

Many further features and combinations thereof concerning embodiments described herein will be apparent to those skilled in the art following a reading of the present disclosure.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
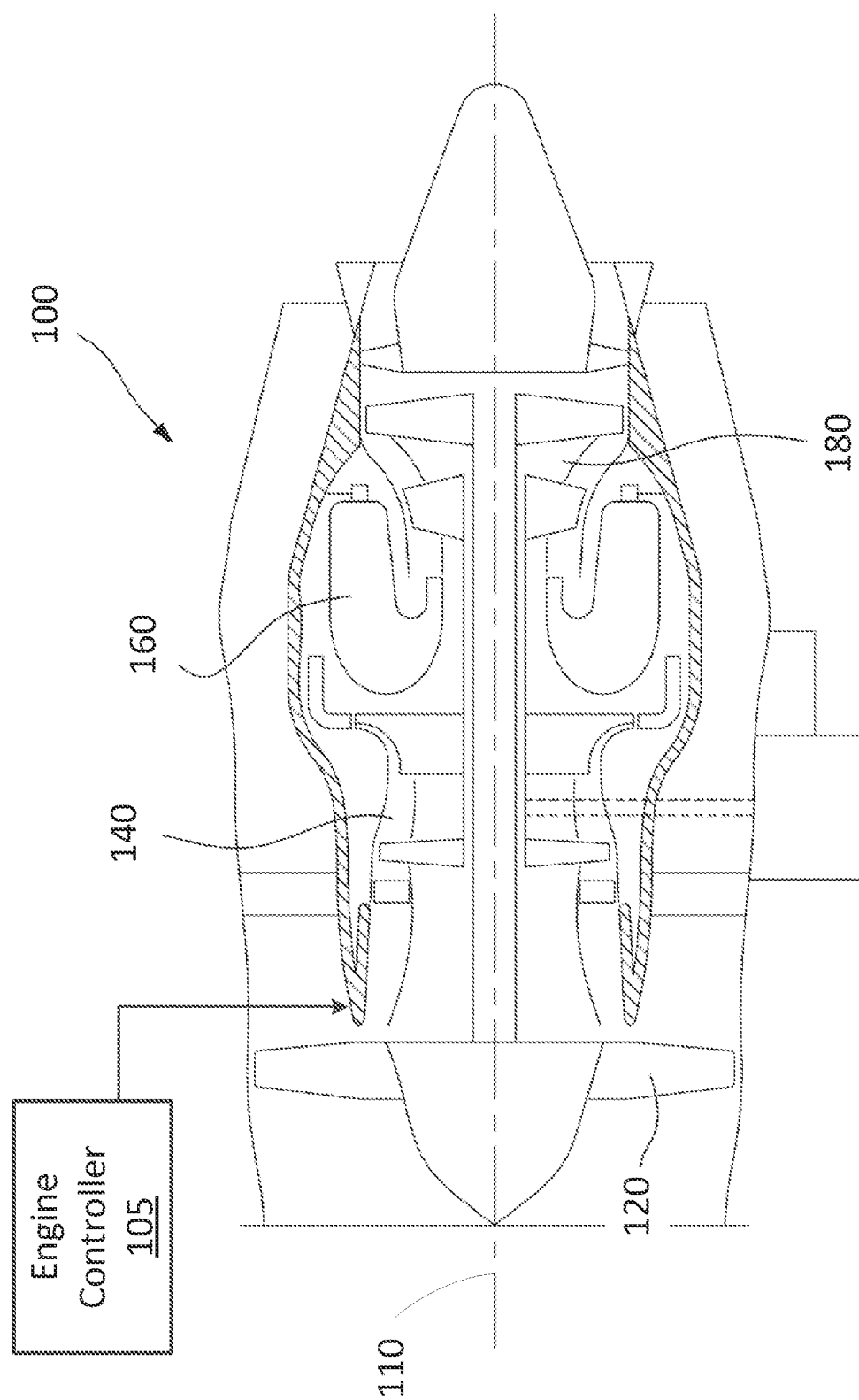
FIG. 1 is a schematic cross sectional view of a gas turbine engine.

With reference to FIG. 1, there is illustrated a gas turbine engine 100. Although the engine 100 illustrated in FIG. 1 is a turbofan engine, the methods and systems described herein may be applicable to components of turboprop, turboshaft, and other types of gas turbine engines, to combustion engines generally, or to components of any other article of manufacture, or the like.

The engine 100 generally comprises in serial flow communication: a fan 120 through which ambient air is propelled, a compressor section 140 for pressurizing the air, a combustor 160 in which the compressed air is mixed with fuel and ignited for generating a stream of hot combustion gases, and a turbine section 180 for extracting energy from the combustion gases. Axis 110 defines an axial direction of the engine 100. In some embodiments, a low pressure spool is composed of a low pressure shaft and a low pressure turbine. The low pressure shaft drives the propeller 120. A high pressure spool is composed of a high pressure turbine attached to a high pressure shaft, which is connected to the compressor section 140. It should be noted that other configurations for the engine 100 are also considered.

Control of the operation of the engine 100 can be effected by one or more control systems, for example an engine controller 105. The engine controller 105 can modulate a fuel flow rate provided to the engine 100, the position and/or orientation of variable geometry mechanisms within the engine 100, a bleed level of the engine 100, and the like. Alternatively, or in addition, control of the engine 100 can be effected by any other suitable control approach, including hydro-mechanical control schemes, or the like.

The engine 100 is composed of a variety of components, or parts, which are manufactured for assembly to produce the engine 100. This may include any number of shafts, gears, valves, tubes, blades, fans, and the like. The manufacturing of parts may involve one or more inspections of the parts, including at different stages of manufacturing. For instance, a particular part may be subjected to three separate machining steps on separate machines, and one or more inspection steps are performed between the three separate machining steps. These inspection steps may be performed by any suitable type of inspection machine.

In some embodiments, the inspection steps include verifying various dimensions of parts. This may include verifying the distance between two surfaces or locations on a part, verifying the diameter of an annular surface, verifying the flatness of a surface, or the like. In the present context, a dimension of a part is considered to be validated when a measured value of the dimension sufficiently corresponds to a known or expected value for the dimension (referred to herein as a "nominal value"), for instance within a predetermined range or threshold (referred to herein as a "tolerance").

Figure 2:
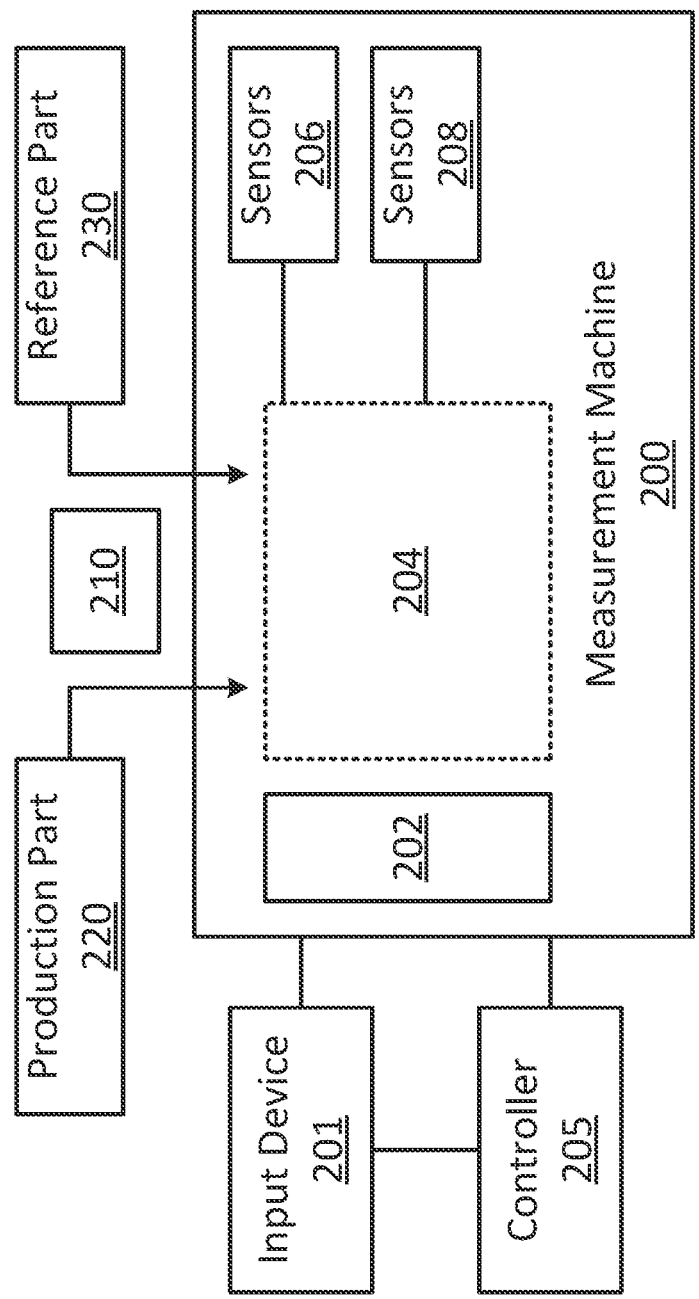
FIG. 2 is a block diagram of an example measurement machine.

With reference to FIG. 2, to verify the dimensions of a part, a measurement machine 200 (sometimes known as a "coordinate-measuring machine" or CMM) may be employed. Other types of measurement machines 200, including machines commonly referred to as computer numerical control (CNC) machines, are also considered. The measurement machine 200 is provided with a retaining mechanism 202 and defines a space 204 into which a part can be placed for inspection by sensors 206, 208. Operation of the measurement machine 200 may be controlled by way of a controller 205, which may form part of the measurement machine itself, or may be separate therefrom. By way of an example, the controller 205 may be integrated into the measurement machine 200 and receive input from an operator via a touchscreen or other input device 201, which may be communicatively coupled to the controller 205 and/or the measurement machine 200 in any suitable fashion. By way of another example, the measurement machine 200 may be communicatively coupled to a remote device which implements the controller 205 and the input device 201. The controller 205 may receive instructions from an operator via the remote device, or may be operated on the basis of commands stored within or otherwise provided to the remote device. The controller 205 then controls the operation of the measurement machine 200 in accordance with the commands.

The sensors 206, 208 may be of any suitable type, and although FIG. 2 illustrates two sensors 206, 208, it should be noted that the measurement machine 200 may include any suitable number of sensors. By way of an example, a touch probe may be used to contact surfaces of a part in succession and track its movement between the surfaces, thereby providing a measure of the distance between the two surfaces. By way of another example, a scan probe may be placed into substantially continuous contact with an annular surface of the part while the part is rotating, thereby providing a measure of the diameter of the annular surface. By way of a further example, a probe may be placed into contact with a surface and moved across the surface while maintaining substantially continuous contact therewith, thereby providing a measure of the flatness of the surface. Although the present disclosure focuses primarily on mechanical probes which rely on mechanical contact with one or more surfaces of a part, it should be noted that the methods and systems described herein may apply to other types of probes, including (but not limited to) optical probes, magnetic probes, and the like.

To perform an inspection, a production part 220, that is to say a part having been at least partially manufactured and destined for use in a finished product (as a non-limiting example, the engine 100) may be placed into the measurement machine 200 by an operator of the measurement machine 200, or by way of a loading mechanism 210 (e.g., a robotic hand or other automated or semi-automated system). The production part 220 is secured in the space 204 by way of the retaining mechanism 202. Sensor 206 and/or sensor 208 may then be operated by the controller 205 to collect various measurement values associated with different dimensions of the production part 220. The obtained measurement values may be compared with nominal values for each of the dimensions. Depending on whether the measurement values match the nominal values (for instance, with predetermined tolerances for each of the nominal values), the production part 220 can be determined to have proper dimensions or not (i.e., is determined as having been correctly manufactured or not).

To ensure proper functioning, the measurement machine 200 may be subjected to a validation process. In some cases, validation of the measurement machine 200 is performed periodically, for instance after a predetermined number of hours of use, after inspecting a predetermined number of production parts 220, or the like. In some other cases, validation of the measurement machine 200 is performed in response to occurrence of particular events. For instance, validation of the measurement machine 200 may be performed when a new operator is assigned to the measurement machine 200, following a cleaning operation for the measurement machine 200, or the like.

To validate the measurement machine 200, a reference part 230 is used. The reference part 230 is a part having one or more known nominal values for one or more dimensions thereof. The nominal values for the various dimensions of the reference part 230 may be determined by way of precise and/or repeated measurements or any other suitable analysis. For instance, the nominal values are determined by averaging multiple different measured values over multiple repeated tests in a controlled environment, which may be performed using a specific measurement instrument, or a measurement instrument with particular characteristics. Regarding the nominal values and dimensions of the reference part 230, and by way of an example, the reference part 230 may define a number of annular surfaces having known diameters. By way of another example, the reference part 230 may define multiple spaced surfaces having known positions and/or distances therebetween, having known flatness, straightness, and/or parallelism, or the like. In some embodiments, the reference part 230 may be comparable or substantially identical to one or more production parts 220. In other embodiments, the reference part 230 is different from the one or more production parts 220. For example, the reference part 230 may be produced having a plurality of annular, planar, and/or angled surfaces corresponding to particular validations to be performed for the measurement machine 200. In some cases, the reference part 230 is made of a material similar to that used for the production parts 220, or a material having a comparable thermal dilation factor.

Figure 3:
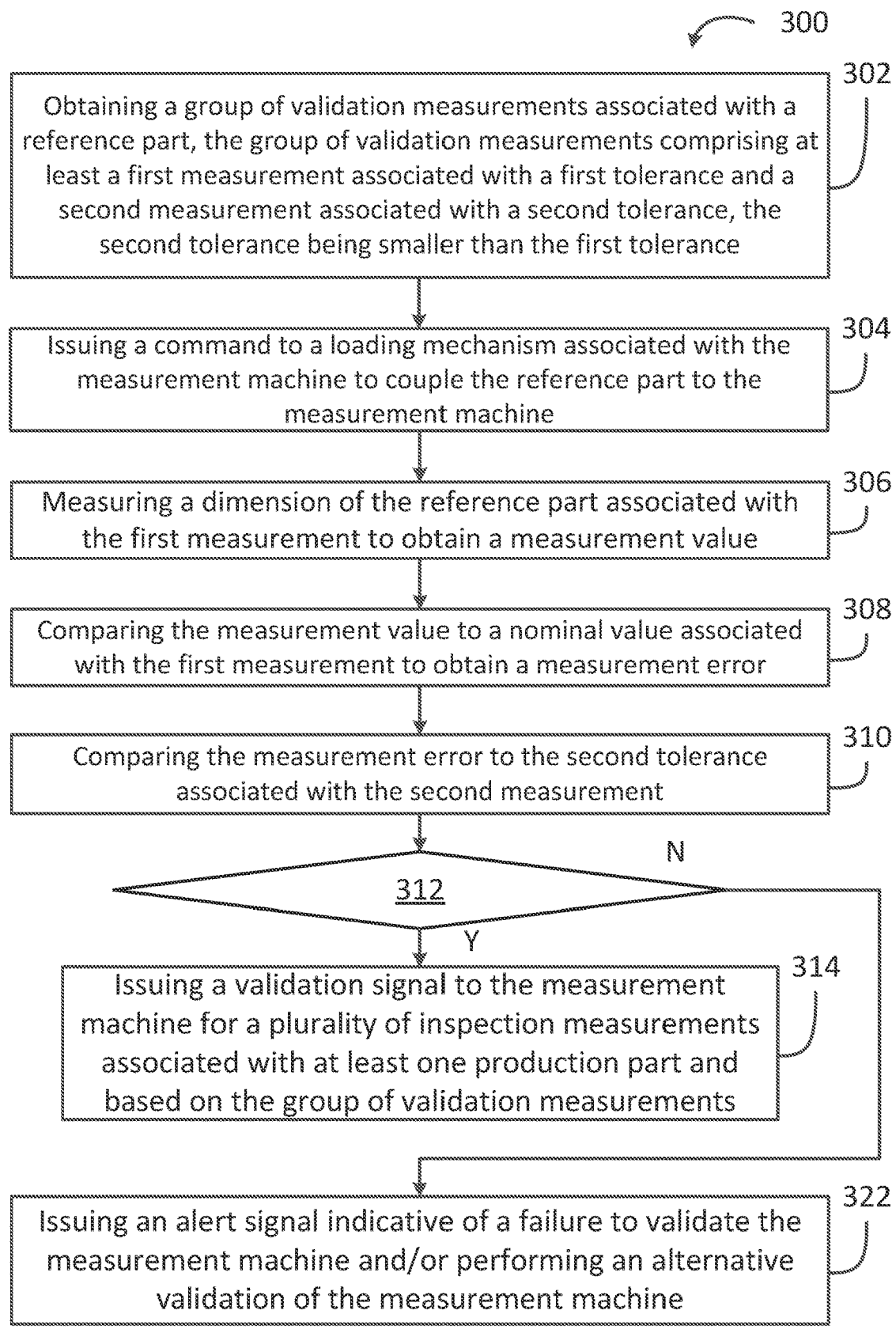
FIG. 3 is a flowchart of an example method for validating a measurement machine.

With additional reference to FIG. 3, there is illustrated a method 300 for validating a measurement machine, for example the measurement machine 200. At step 302, the method 300 comprises obtaining a group of validation measurements associated with a reference part, for example the reference part 230. The group of validation measurements includes various validation measurements to be performed on the reference part 230, for example one or more distance measurements, one or more diameter measurements, one or more flatness measurements, or the like, which have known measurement values. The validation measurements comprise at least a first measurement, which is associated with a first tolerance, and a second measurement, associated with a second tolerance, though the group may include any suitable number of validation measurements, which may each have a respective associated tolerance. In some cases, each of the validation measurements is associated with a respective tolerance different from the tolerances of the other validation measurements. In some other cases, one or more of the validation measurements may be associated with a common tolerance. The validation measurements may be obtained by the controller 205 from a remote resource or data store to which it is communicatively coupled, or may be stored within a memory or other data store of the controller 205.

In some embodiments, the first measurement is a largest one of the group of validation measurements, and the second measurement is a smallest one of the group of validation measurements. In some other embodiments, the first and second measurements are different measurements, with the first measurement being larger than the second measurement, though the second measurement may instead be larger than the first. Thus, in some embodiments, the second tolerance is associated with the smallest measurement of the group of validation measurements. The second tolerance, which is associated with the second measurement, may be the smallest tolerance of the tolerances associated with the validation measurements, or may be a tolerance smaller than the first tolerance, which is associated with the first measurement. It should be understood that the second tolerance, which is smaller than the first tolerance, is smaller in an absolute sense, and in some cases may be smaller in a relative sense. Put differently, the first and second tolerance may both be an equivalent relative value (e.g., 10% of the associated first and second measurements), or may be different relative values (e.g., the first tolerance being 5%, and the second tolerance being 2%). In either case, the absolute value of the second tolerance is smaller than the absolute value of the first tolerance (e.g., the first tolerance being 0.1 cm, and the second tolerance being 0.05 cm).

In some embodiments, the group of validation measurements is obtained on the basis of one or more production parts 220. The controller 205, or another element of the measurement machine 200, receives an indication of the one or more production parts 220, and selects the group of validation measurements based on the one or more production parts 220. For example, the production part(s) 220 may be associated with various inspection measurements to be performed: for a given production part 220, the measurement machine 200 may be instructed to perform various predetermined distance, diameter, and/or flatness measurements, and thus a predetermined group of validation measurements may be established on the basis of the predetermined inspection measurements to be performed on the production part 220. The validation measurements may be identical to the inspection measurements, may be a subset thereof, or may be different therefrom. For example, if the inspection measurements for a given production part 220 include measuring diameters of 5.56 cm, 4.20 cm, and 3.14 cm, a set of validation measurements at 6 cm, 4 cm, and 3 cm may be established by rounding the inspection measurements. In some embodiments in which the indication includes a list of a plurality of production parts 220, the group of validation measurements may be selected by obtaining multiple groups of inspection measurements, each based on one of the production parts 220 of the list, and consolidating the groups of inspection measurements associated with the plurality of production parts. For example, the inspection measurements for three different production parts may include measuring multiple distances in a range of 6 cm to 4 cm; these inspection measurements may be consolidated into a single validation measurement of a distance of 5 cm. In some embodiments, the consolidation of multiple inspection measurements may be performed on the basis of one or more correlation studies which evaluate the nature of the error produced by the sensors 206, 208. In some other embodiments, the selection of the validation measurements is performed on the basis of one or more industry standards establishing guidelines for validation of measurement machines.

In some embodiments, at step 304, the method 300 comprises issuing a command to a loading mechanism associated with the measurement machine 200, for instance the loading mechanism 210, to couple the reference part 230 to the measurement machine 220. The command may be issued by the measurement machine 200 itself and/or by the controller 205, or in any other suitable fashion. The command may be automated as part of the method 300, or may be issued in response to an input from an operator of the measurement machine 200, for instance via the input device 201. By way of an example, the command may be automatically issued in response to obtaining the group of validation measurements at step 302. By way of another example, the controller 205 may present a popup or other indication to the operator, for instance via a display of the measurement machine 200, prompting the operator to command the loading mechanism 210 to couple the reference part to the measurement machine 200. In some embodiments, a predetermined time delay may be allowed to elapse after coupling the reference part 230 to the measurement machine 220 before proceeding with the method 300, for instance to allow the reference part to acclimate to the conditions (pressure, temperature, etc.) within the space 204 of the measurement machine 200.

At step 306, the method 300 comprises measuring a dimension of the reference part 230 associated with the first measurement to obtain a measurement value. As noted hereinabove, the group of validation measurements includes a first measurement, which may be a largest diameter, a largest distance, a flatness associated with a largest surface, or any other suitable measurement. The measuring of the dimension may involve commanding one or more of the sensors 206, 208, for instance via the controller 205, to obtain the measurement value. By way of an example, the diameter of an annular surface of the reference part 230 is measured by contacting the annular surface with a probe or other sensor. By way of another example, a distance between two different surfaces of the reference part 230 is measured by contacting the first and second surfaces with a probe or other sensor. By way of a further example, a dimension (diameter, distance, flatness, or other) is measured by way of performing an optical measurement of at least one of the surfaces of the reference part 230 using an optical sensor. Other approaches are also considered.

At step 308, the method 300 comprises comparing the measurement value, obtained at step 306, to a nominal value associated with the first measurement to obtain a measurement error. As noted hereinabove, the group of validation measurements to be performed on the reference part 230 have known measurement values, referred to as nominal values. Thus, the measurement value obtained at step 306 is compared to the nominal value for the first measurement, and the difference between the two defines a measurement error.

At step 310, the method 300 comprises comparing the measurement error, obtained at step 308, to the second tolerance associated with the second measurement. For clarity, it is noted that the measurement value obtained at step 306 is the measurement value for the first measurement of the group of validation measurements, which is associated with a first tolerance. The measurement error resulting from comparing the measurement value for the first measurement (of the group of validation measurements) to the nominal value is compared to a tolerance (i.e. the second tolerance) associated with the second measurement (of the group of validation measurements), which differs from the first tolerance associated with the first measurement. It should be noted that the comparing operations performed as part of steps 308 and 310 may be performed in any suitable fashion, and by any suitable entity, including the measurement machine 200 and/or the controller 205.

At decision step 312, a determination is made regarding whether the measurement error, obtained at step 308, is less than the second tolerance. When the measurement error is less than the second tolerance, the method 300 moves from step 312 to step 314. When the measurement error is greater than the second tolerance, the method 300 moves from step 312 to step 322.

At step 314, the method 300 comprises issuing a validation signal to the measurement machine 200 for a plurality of inspection measurements associated with at least one production part, for instance the production part 220, and based on the group of validation measurements. The validation signal may authorize the measurement machine 200 to perform the plurality of inspection measurements on the production part 220. The authorization provided to the measurement machine 200 may be to perform a group of inspection measurements within a range based on the group of validation measurements, to perform a group of inspection measurements which correspond to one or more of the measurements which form the group of validation measurements obtained at step 302, or any other suitable group of inspection measurements. Put differently, by confirming that the measurement value obtained at step 306 matches the nominal value (associated with the first measurement) within the second tolerance (associated with the second measurement) the measurement machine 200 may be authorized to perform multiple inspection measurements based on the validation measurements as a group, without performing each of the validation measurements.

In some embodiments, the group of validation measurements are measurements for which the sensor error is correlated, that is to say where error due to the operation of the sensors 206, 208 is correlated. The validation measurements may be established as being correlated on the basis of any suitable statistical analysis. In some cases, the measurement of different types of dimensions (distances, diameters, etc.) may or may not be correlated on the basis of the type of sensor 206, 208 used.

At step 322, the measurement machine is not authorized to perform the plurality of inspection measurements the production part 220, and one or more corrective actions may be taken. In some embodiments, step 322 comprises issuing an alert signal to an operator of the measurement machine 200. The alert signal may be indicative of a failure to validate the measurement machine 200, and in some instances may provide instructions for the operator regarding the corrective actions to be taken. For example, the alert signal may provide an indication of a maintenance action to be performed on the measurement machine 200 by the operator. In some other embodiments, step 322 comprises performing an alternative validation of the measurement machine. In some embodiments, the alternative validation may be based on measuring dimensions of the reference part 230 associated with the remaining validation measurements of the group of validation measurements that were not previously performed (i.e., measurements of the group of validation measurements not including the first measurement performed at step 306). When performing the remaining validation measurements, measurement errors may be obtained (in similar fashion to that described in part 308), but each measurement error may be compared to the tolerance associated with the measurement in question. For example, the measurement error for a first remaining validation measurement is compared to the tolerance associated with the first remaining validation measurement itself, rather than to the second tolerance associated with the second measurement of the group of validation measurements.

In some other embodiments, the alternative validation may be based on an alternative group of validation measurements associated with the reference part 230 or with an alternative reference part 230. The alternative group of validation measurements may be obtained, for instance in similar fashion as is described hereinabove in relation to step 302, and then used to validate the measurement machine 220 by repeating one or more steps of the method 300. The alternative validation, based on the alternative group of validation measurements, may require measuring and comparing measurement values for each validation measurement of the group, and thus may require performing more measurements than performed at step 306. The alternative validation may also compare the measurement values for each validation measurement of the group to their respective tolerances, rather than to the tolerance associated with the second measurement of the group of validation measurements. Other corrective actions are also considered as part of step 322, such as repeating steps 302 to 312 using an alternative reference part 230, or the like.

When, at decision step 312, it is determined that the measurement error is equal to the second tolerance, the method 300 may move to step 314 or to step 322, depending on the particular implementation. For instance, an entity operating the measurement machine 200 may accept a measurement error equal to the relevant tolerance as indicative of the measurement machine 200 being validated. In another instance, the entity operating the measurement machine 200 may only consider the measurement machine 200 to be validated if the measurement error is strictly less than the relevant tolerance.

In one example implementation, the validation measurements include five different distance measurements (e.g., 20 cm, 10 cm, 5 cm, 3 cm, 1 cm), ranging from a largest distance measurement (20 cm) to a smallest distance measurement (1 cm). Each of the five distance measurements are associated with a respective tolerance, for instance 1% of the measurement value (e.g., 0.2 cm, 0.1 cm, 0.05 cm, 0.03 cm, 0.01 cm). The group of validation measurements are obtained by the controller 205 at step 302, and in some cases a command is issued to the loading mechanism 210 to couple the reference part 230 with the measurement machine 200, for instance via the retaining mechanism 202. As part of step 306, the first measurement is performed (e.g., the largest measurement) and a measurement value is obtained (e.g., 20.008 cm). At step 308, the measurement value (20.008 cm) is compared to the nominal value for the first measurement (20 cm) to obtain the measurement error (0.008 cm), which is compared to the tolerance associated with the second measurement (e.g., the smallest measurement, having a tolerance of 0.01 cm) at step 310. As part of decision step 312, the measurement error (0.008 cm) is determined to be less than the tolerance associated with the second measurement (0.01 cm), and thus the method 300 proceeds to step 314, at which a validation signal is issued to the measurement machine 200, for instance to authorize the measurement machine 200 to perform one or more inspection measurements on the production part(s) 220.

In certain embodiments, some or all of the steps of the method 300 may be repeated for different groups of validation measurements, for different sensors, for different reference parts 230, or the like. For example, the method 300 may be performed with a given reference part 230 first for the sensor 206, and may be repeated with the same reference part 230 for the sensor 208. In another example, the method 300 is repeated with different reference parts 230 for each of the sensors 206, 208. In some embodiments, the validation of the measurement machine 200 is performed in response to a request issued by the measurement machine 200, or by the controller 205. In some other embodiments, the measurement machine 200 may be authorized to perform inspection measurements for a predetermined time period, for instance based on when the measurement machine 200 was last validated. When the authorization expires (i.e., the predetermined time period runs out), the measurement machine 200 may be prevented from performing inspection measurements until a subsequent validation of the measurement machine 200 is performed.

Figure 4:
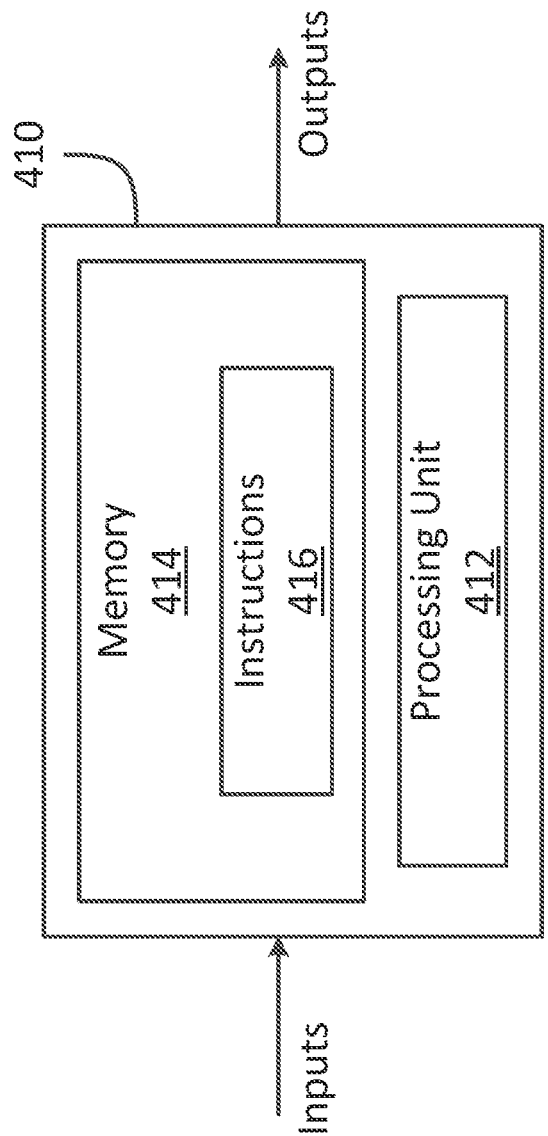
FIG. 4 is a block diagram of an example computing device.

With reference to FIG. 4, an example of a computing device 410 is illustrated. For simplicity, only one computing device 410 is shown; it should nevertheless be understood that multiple computing devices 410 operable to exchange data may be employed, as appropriate. The computing devices 410 may be the same or different types of devices. The controller 205 of the measurement machine 200, as well as one or more other portions of the measurement machine 200 (e.g., part of the sensors 206, 208) may be implemented, in whole or in part, using one or more computing devices 410. The controller 205 and/or other portions of the measurement machine 200 may be implemented using physical computing devices, distributed computing devices, virtual computing devices (i.e., implemented within one or more virtual machines), or any suitable combination thereof.

The computing device 410 comprises a processing unit 412 and a memory 414 which has stored therein computer-executable instructions 416. The processing unit 412 may comprise any suitable devices configured to implement the functionality described herein, including the various methods described hereinbelow, such that instructions 416, when executed by the computing device 410 or other programmable apparatus, may cause the functions/acts/steps described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 416 executable by processing unit 412.

The methods and systems for validating a measurement machine described herein may be implemented in a high level procedural or object oriented programming or scripting language, or a combination thereof, to communicate with or assist in the operation of a computer system, for example the computing device 410. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 412 of the computing device 410, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, multiple measurement values for the first measurement may be obtained and used to obtain multiple measurement errors which are then compared to the relevant tolerance. Yet further modifications could be implemented by a person of ordinary skill in the art in view of the present disclosure, which modifications would be within the scope of the present technology.

The invention claimed is:

1. A method for validating a sensor, comprising:
obtaining a group of validation measurements associated with a reference part, the group of validation measurements comprising at least a first measurement associated with a first tolerance and a second measurement associated with a second tolerance, the second tolerance being smaller than the first tolerance;
measuring, with the sensor, a dimension of the reference part associated with the first measurement to obtain a measurement value;
comparing the measurement value to a nominal value associated with the first measurement to obtain a measurement error;
comparing the measurement error to the second tolerance associated with the second measurement;
determining the measurement error is less than the second tolerance, and in response to the determining;
issuing a validation signal to the sensor for a plurality of inspection measurements associated with at least one production part and based on the group of validation measurements; and
authorizing the sensor to perform a group of inspection measurements.

2. The method of claim 1, wherein the obtaining of the group of validation measurements comprises obtaining an indication of the at least one production part and selecting the group of validation measurements based on the plurality of inspection measurements associated with the at least one production part.

3. The method of claim 2, wherein the obtaining of the indication of the at least one production part comprises obtaining a list of a plurality of production parts, and wherein the selecting of the group of validation measurements comprises consolidating multiple pluralities of inspection measurements associated with the plurality of production parts.

4. The method of claim 1, wherein the measuring of the dimension of the reference part associated with the first measurement comprises at least one of measuring a diameter of an annular surface of the reference part and measuring a distance between first and second surfaces of the reference part.

5. The method of claim 1, wherein the authorizing the sensor to perform a group of inspection measurements comprises authorizing the sensor to perform a group of inspection measurements within a range of values based on the group of validation measurements.

6. The method of claim 1, wherein the authorizing the sensor to perform a group of inspection measurements comprises authorizing the sensor to perform a group of inspection measurements corresponding to at least one measurement of the group of validation measurements.

7. The method of claim 1, wherein the measuring of the dimension of the reference part associated with the first measurement comprises measuring one of a plurality of dimensions of the reference part which is different from the at least one production part.

8. The method of claim 1, further comprising, when the measurement error is greater than the second tolerance, issuing an alert signal indicative of a failure to validate the sensor.

9. The method of claim 1, further comprising, when the measurement error is greater than the second tolerance, performing an alternative validation of the sensor by measuring dimensions of the reference part associated with remaining validation measurements of the group of validation measurements.

10. The method of claim 1, further comprising, when the measurement error is greater than the second tolerance, performing an alternative validation of the sensor based on an alternative group of validation measurements associated with the reference part.

11. A system for validating a sensor, comprising:
a processing device; and
a non-transitory computer-readable medium having stored thereon instructions executable by the processing device for causing the system to perform:
obtaining a group of validation measurements associated with a reference part, the group of validation measurements comprising at least a first measurement associated with a first tolerance and a second measurement associated with a second tolerance, the second tolerance being smaller than the first tolerance;
measuring, with the sensor, a dimension of the reference part associated with the first measurement to obtain a measurement value;
comparing the measurement value to a nominal value associated with the first measurement to obtain a measurement error;
comparing the measurement error to the second tolerance associated with the second measurement; and
when the measurement error is less than the second tolerance,
issuing a validation signal to the sensor for a plurality of inspection measurements associated with at least one production part and based on the group of validation measurements; and
authorizing the sensor to perform a group of inspection measurements.

12. The system of claim 11, wherein the obtaining of the group of validation measurements comprises obtaining an indication of the at least one production part and selecting the group of validation measurements based on the plurality of inspection measurements associated with the at least one production part.

13. The system of claim 12, wherein the obtaining of the indication of the at least one production part comprises obtaining a list of a plurality of production parts, and wherein the selecting of the group of validation measurements comprises consolidating multiple pluralities of inspection measurements associated with the plurality of production parts.

14. The system of claim 11, wherein the measuring of the dimension of the reference part associated with the first measurement comprises at least one of measuring a diameter of an annular surface of the reference part and measuring a distance between first and second surfaces of the reference part.

15. The system of claim 11, wherein the authorizing the sensor to perform a group of inspection measurements comprises authorizing the sensor to perform a group of inspection measurements within a range of values based on the group of validation measurements.

16. The system of claim 11, wherein the authorizing the sensor to perform a group of inspection measurements comprises authorizing the sensor to perform a group of inspection measurements corresponding to at least one measurement of the group of validation measurements.

17. The system of claim 11, wherein the measuring of the dimension of the reference part associated with the first measurement comprises measuring one of a plurality of dimensions of the reference part which is different from the at least one production part.

18. The system of claim 11, wherein the instructions are further executable by the processing unit for, when the measurement error is greater than the second tolerance, issuing an alert signal indicative of a failure to validate the sensor.

19. The system of claim 11, wherein the instructions are further executable by the processing unit for, when the measurement error is greater than the second tolerance, performing an alternative validation of the sensor by measuring dimensions of the reference part associated with remaining validation measurements of the group of validation measurements.

20. The system of claim 11, wherein the instructions are further executable by the processing unit for, when the measurement error is greater than the second tolerance, performing an alternative validation of the sensor based on an alternative group of validation measurements associated with the reference part.

* * * * *